United States Patent [19]
Izawa et al.

[11] Patent Number: 5,315,389
[45] Date of Patent: May 24, 1994

[54] INTENSITY CORRECTION DEVICE FOR PROVIDING A CORRECTION SIGNAL FOR AUTOMATICALLY CORRECTING AN INTENSITY OF A VIDEO SIGNAL

[75] Inventors: Yosuke Izawa, Ibaraki; Naoji Okumura, Minoo, both of Japan

[73] Assignee: Matsushita Electric Industrial Co., Ltd., Osaka, Japan

[21] Appl. No.: 904,214

[22] Filed: Jun. 25, 1992

[30] Foreign Application Priority Data

Jun. 28, 1991 [JP] Japan .................. 3-158193

[51] Int. Cl.$^5$ ............................................. H04N 5/208
[52] U.S. Cl. ................................... 348/672; 382/18
[58] Field of Search ............... 358/168, 169, 163, 160, 358/166; 382/51, 18; H04N 5/235, 5/57, 5/14, 5/208

[56] References Cited

U.S. PATENT DOCUMENTS

| | | | |
|---|---|---|---|
| 4,695,884 | 9/1987 | Anastassiou | 358/163 |
| 5,133,022 | 7/1992 | Weideman | 382/18 |
| 5,140,649 | 8/1992 | Kageyama | 382/51 |
| 5,239,378 | 8/1993 | Tsuji et al. | 358/166 |
| 5,241,386 | 8/1993 | Tsuji et al. | 358/166 |

FOREIGN PATENT DOCUMENTS

| | | | |
|---|---|---|---|
| 0238962 | 9/1987 | European Pat. Off. | G06F 15/68 |
| 0258673 | 3/1988 | European Pat. Off. | H04N 1/46 |
| 225879 | 9/1988 | Japan . | |

OTHER PUBLICATIONS

Proc. SPIE–Int. Soc. Opt. Eng., vol. 575, Aug. 1985 pp. 106–113, O'Gorman et al., "Entropy–Constant Image Enhancement by Histogram Transformation."

*Primary Examiner*—James J. Groody
*Assistant Examiner*—Chris Grant
*Attorney, Agent, or Firm*—Spencer, Frank & Schneider

[57] ABSTRACT

The invention relates to an intensity correction device for automatically adjusting an intensity of an input video signal by detecting luminance characteristics of the input signal, and provide intensity correction with maintaining clear image by reducing magnitude of the correction signal or by not effecting correction when the luminance level of the input luminance signal is concentrated to a certain luminance level. The intensity correction device includes a histogram memory, a look-up table operating circuit, a look-up table, a maximum value detecting circuit, and an inverter and a multiplier, limiter, or a gain control circuit. By this, when a luminance level of the input video signal is concentrated to a certain luminance level, magnitude of the correction signal can be reduced or made zero. Therefore, by detecting the characteristics of the input image, the intensity of the input video signal can be automatically corrected to the optimal image for providing better picture quality.

4 Claims, 9 Drawing Sheets

INTENSITY CORRECTION DEVICE FOR PROVIDING A CORRECTION SIGNAL FOR AUTOMATICALLY CORRECTING AN INTENSITY OF A VIDEO SIGNAL

BACKGROUND OF THE INVENTION

The present invention relates to an intensity correction device for detecting an intensity of an input image and automatically adjusting the intensity of a video signal from a television receiver, a video tape recorder, a video projector or so forth, for obtaining an optimal image.

In recent years, there is a tendency for requiring higher picture quality for television receivers. For this, an intensity correction device which can automatically obtain an optimal intensity with detecting feature of an input image has been given higher importance.

Figure 8:
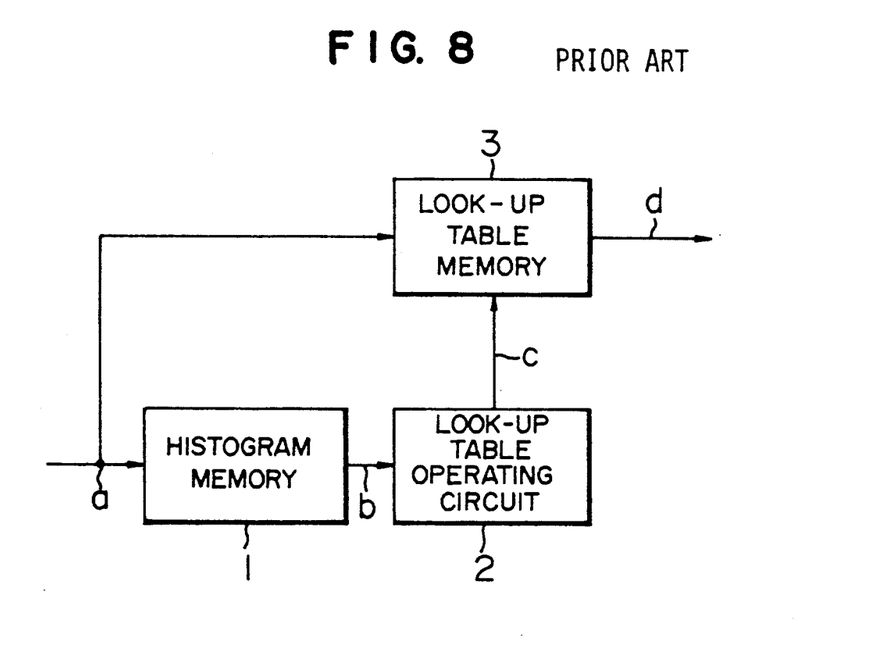
FIG. 8 is a block diagram of a conventional intensity correction device.

Description of a conventional intensity correction device will be given with reference to FIGS. 8 and 9. FIG. 8 shows construction of the conventional intensity correction device. In FIG. 8, reference numeral 1 denotes a histogram memory for obtaining luminance distribution of an input luminance signal. Reference numeral 2 denotes a look-up table operating circuit for performing accumulation of a histogram and normalizing respective data so that the maximum cumulative frequency becomes coincident with a maximum value of an output luminance signal. Reference numeral 3 denotes a look-up table memory for storing data normalized by the look-up table operating circuit 2 and for permitting output of a correction signal corresponding to a luminance level of the input signal.

Operation of the intensity correction device constructed set forth above will be discussed below with reference to FIG. 9.

FIG. 9 is a plurality of graphs illustrating a manner of luminance conversion in the prior art.

Figure 9A:
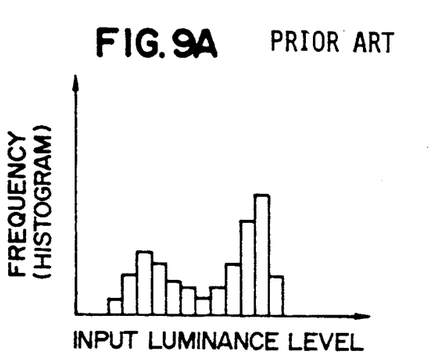
FIGS. 9A–9H are plurality of graphs for illustrating operation of the prior art.
Figure 9B:
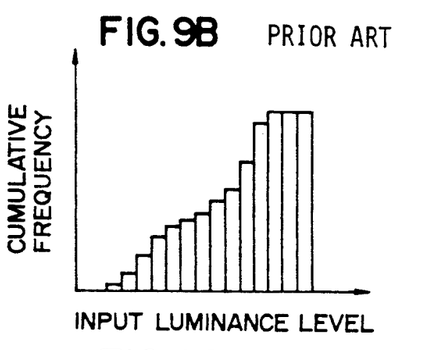
Figure 9C:
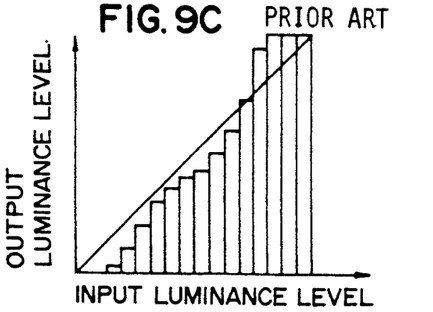
Figure 9D:
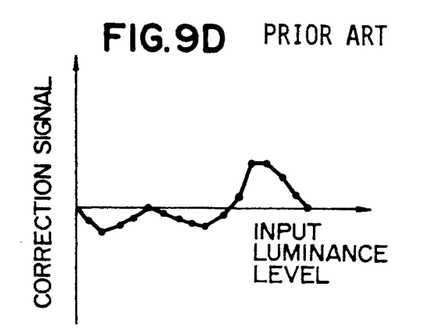
Figure 9E:
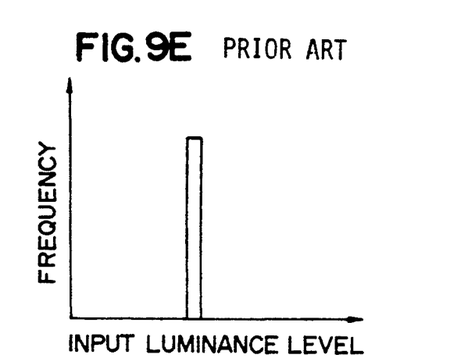
Figure 9F:
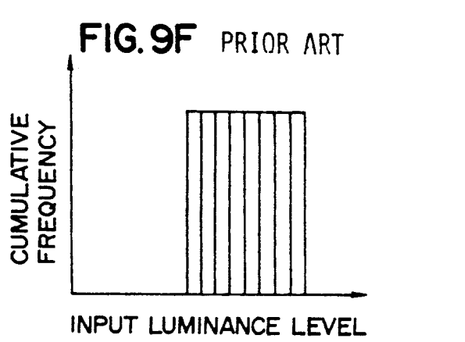
Figure 9G:
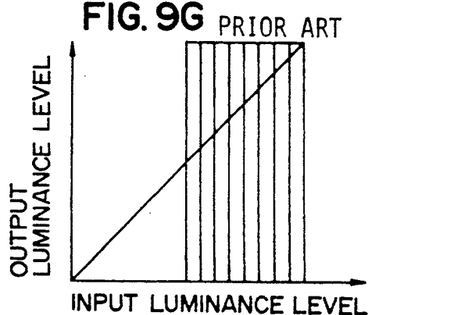
Figure 9H:
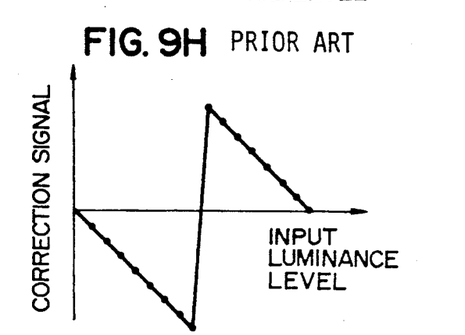

At first, a histogram is established by accumulating input luminance levels into appropriate intensity groups. Then, the luminance distribution of an input luminance signal a, as illustrated in FIG, 9A, is stored in the histogram memory 1. The contents of memory 1 is periodically cleared to reset respective data to zero. The interval for clearing the data in memory 1 is typically selected to be a period corresponding to a vertical scanning interval of the video signal of the vertical scanning interval. Next, look-up table operating circuit 2 accumulates the data of the histogram, calculates a normalizing coefficient so that the maximum cumulative frequency of occurrence of the input luminance can be the maximum value of the output luminance level, and multiples respective data of the histogram by derived coefficient. The results are stored in look-up table memory 3. This procedure is illustrated in FIGS. 9B and 9C. Look-up table memory 3 outputs a difference between the data corresponding to a luminance level of the input signal a and the luminance level as a correction signal d as shown in FIG. 9D. Intensity correction is performed with this correction signal d.

However, in the construction set forth above, when the input luminance signal is concentrated at a particular luminance level, the luminance level is corrected in an excessive manner as illustrated in FIGS. 9E to 9H. In the case of a dynamic image of the television, the corrected image is far different from the actual image and the picture quality is rather degraded.

SUMMARY OF THE INVENTION

In view of the drawback of the prior art as set forth above, it is an object of the present invention to provide an intensity correction device which reduces the degree of correction or makes no correction when an input luminance signal is concentrated at a particular luminance level.

In order to accomplish this object, an intensity correction device, according to a first aspect of the invention includes, a histogram memory for forming a histogram of an input luminance signal;

a look-up table operating circuit for accumulating and normalizing the histogram so that the maximum cumulative frequency becomes the maximum value of an output luminance signal;

a look-up table memory for storing the normalized data and outputting a correction signal;

a maximum value detecting circuit for detecting the maximum value of the histogram; and a multiplier for multiplying an inverse value of the maximum value and the correction signal.

Also, an intensity correction device, according to a second aspect of the invention includes, a histogram memory for forming a histogram of an input luminance signal;

a look-up table operating circuit for accumulating and normalizating the histogram so that the maximum cumulative frequency becomes the maximum value of an output luminance signal;

a look-up table memory for storing the normalized data and outputting a correction signal;

a maximum value detecting circuit for detecting a maximum value of differences of the normalized data; and a multiplier for multiplying an inverse value of the maximum value and the correction signal.

Furthermore, an intensity correction device, according to a third aspect of the invention includes, a histogram memory for forming a histogram of an input luminance signal;

a look-up table operating circuit for accumulating and normalizing so that the maximum cumulative frequency becomes the maximum value of an output luminance signal;

a look-up table memory for storing the normalized data and outputting a correction signal;

a maximum value detecting circuit for detecting a maximum value of differences of the normalized data; and a limiter for setting the correction signal to zero when the maximum value exceeds a predetermined value.

In addition, an intensity correction device, according to a fourth aspect of the invention includes, a histogram memory for forming a histogram of an input luminance signal;

a look-up table operating circuit for accumulating and normalizing the histogram so that the maximum cumulative frequency becomes the maximum value of an output luminance signal;

a look-up table memory for storing the normalized data and outputting a correction signal;

a maximum value detecting circuit for detecting a maximum value of differences of the normalized data; and a gain control circuit for varying gain of the correction signal depending upon the maximum value.

With the above-mentioned first aspect of the invention, by obtaining the histogram, detecting the maximum value of the data of the obtained histogram, and multiplying the inverse value of the maximum value and the correction signal, the magnitude of correction can be reduced when the luminance level of the input luminance signal is concentrated to the certain luminance level.

With the second aspect of the invention, by obtaining the histogram of the input luminance signal, accumulating the obtained histogram, normalizing so that the maximum cumulative frequency becomes the maximum value of the output luminance signal, detecting the maximum value of the difference of the normalized data and multiplying the inverse value of the maximum value and the correction signal, the magnitude of correction can be reduced when the luminance level of the input luminance signal is concentrated to the certain luminance level.

With the third aspect of the invention, by obtaining the histogram of the input luminance signal, accumulating the obtained histogram, normalizing so that the maximum cumulative frequency becomes the maximum value of the output luminance signal, detecting the maximum value of the difference of the normalized data and making the correction signal to zero when the maximum value exceeds a predetermined value, the correction can be made zero when the input luminance signal is concentrated to the certain luminance level.

With the fourth aspect of the invention, by obtaining the histogram of the input luminance signal, accumulating the obtain histogram, normalizing so that the maximum cumulative frequency becomes the maximum value of the output luminance signal, detecting the maximum value of the difference of the normalized data and varying the gain of the correction signal depending upon the maximum value, the magnitude signal is concentrated to the certain luminance level.

DESCRIPTION OF THE PREFERRED EMBODIMENT

The various embodiments of the present invention will be discussed with reference to the accompanying drawings.

Figure 1:
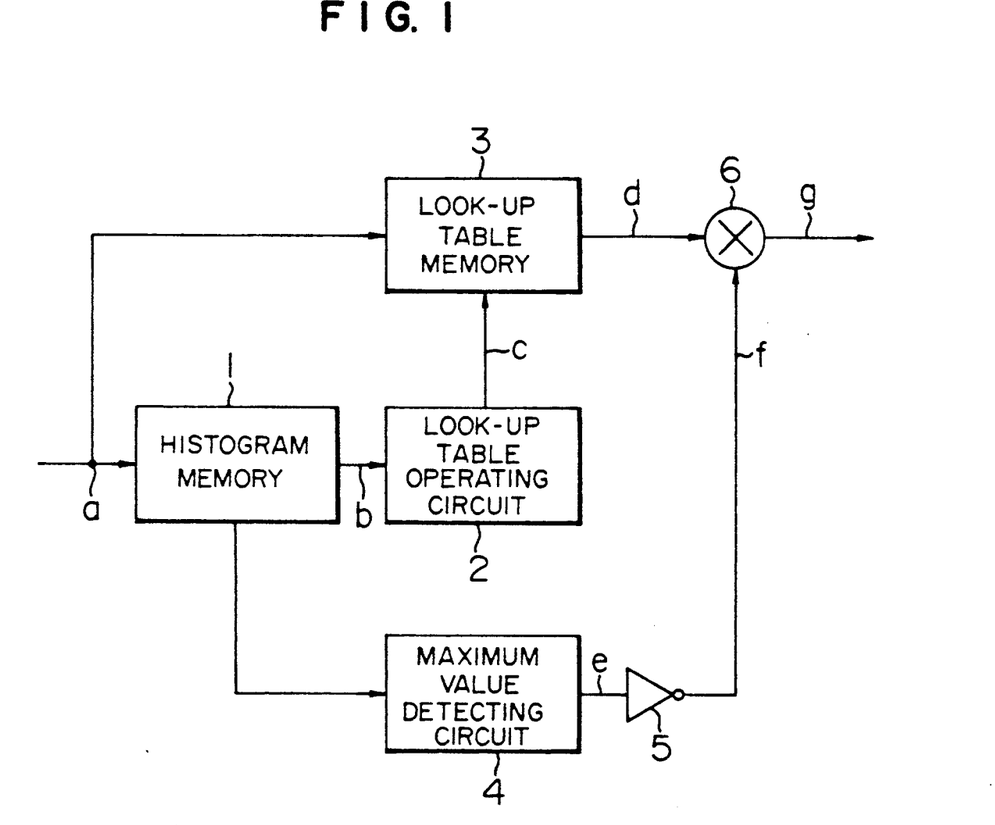
FIG. 1 is a block diagram of a first embodiment of an intensity correction device according to the present invention.

FIG. 1 is a block diagram showing the first embodiment of an intensity correction device according to the present invention. In FIG. 1, reference numeral 1 denotes a histogram for detecting luminance distribution of an input luminance signal. Reference numeral 2 denotes a look-up table operating circuit 2 for accumulating the histogram and normalizing data b of the histogram so that the maximum cumulative frequency becomes the maximum value of an output luminance signal. Reference numeral 3 denotes a look-up table memory for storing the data C normalized by the look-up table operating circuit 2 and for permitting output of a correction signal corresponding to the luminance level of the input signal. Reference numeral 4 denotes a maximum value detecting circuit for detecting a maximum value of the data of the histogram obtained at histogram memory 1. Reference numeral 5 denotes an inverter for obtaining an inverse value of the maximum value obtained by maximum value detecting circuit 4. Reference numeral 6 denotes a multiplier for multiplying the inverse value of the maximum value obtained through inverter 6 by the correction signal output from the look-up table memory 3.

Operation of the first embodiment of the intensity correction device constructed as set forth above will be discussed with reference to FIG. 2. FIG. 2 shows manner of luminance conversion.

Figure 2A:
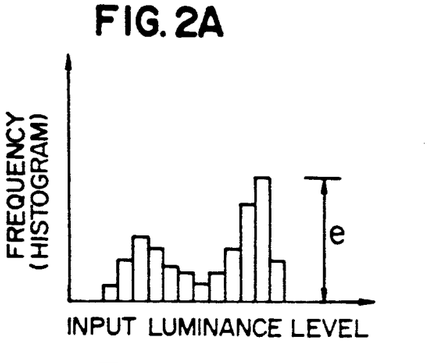
FIGS. 2A–2H are plurality of graphs for illustrating operation of the first embodiment of the intensity correction device.
Figure 2B:
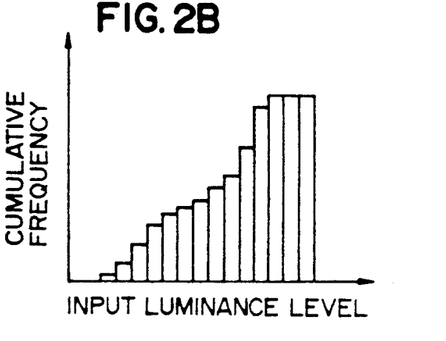
Figure 2C:
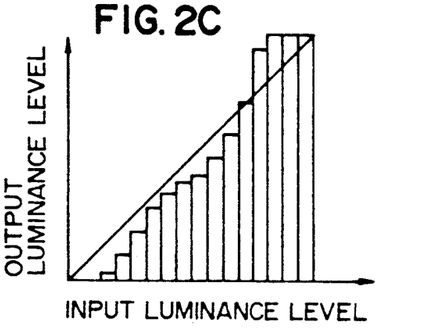
Figure 2D:
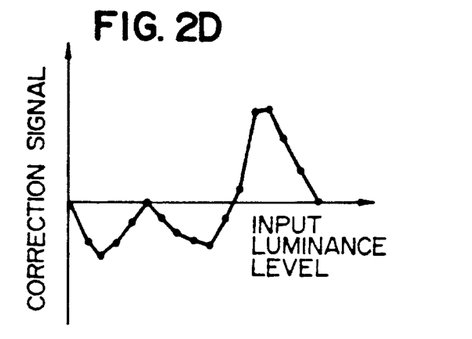
Figure 2E:
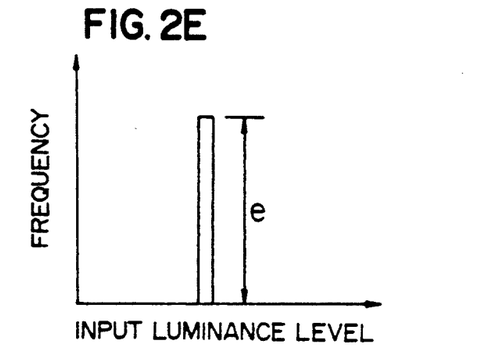
Figure 2F:
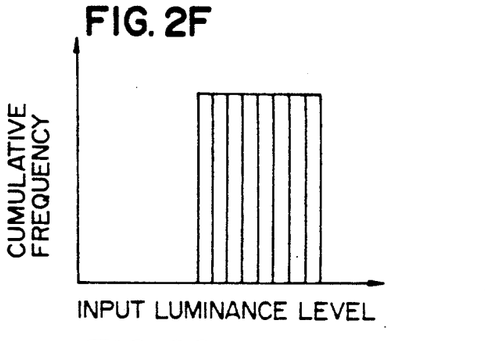
Figure 2G:
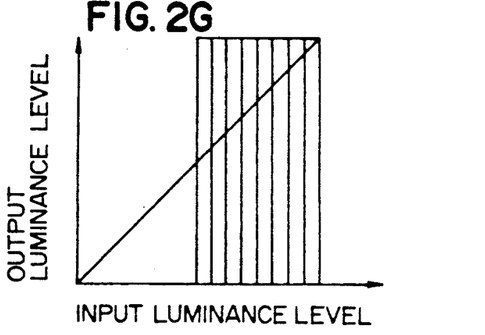
Figure 2H:
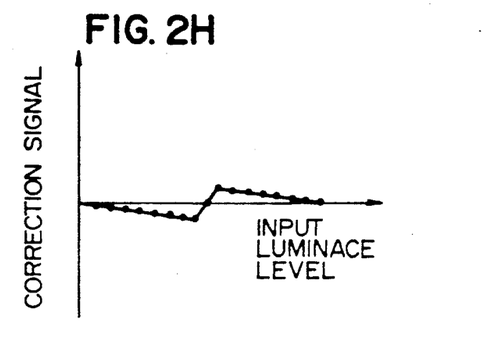

At first, a histogram is established by accumulating input luminance levels into an appropriate intensity groups. Then, the luminance distribution of input luminance signal a as illustrated in FIG. 2A is stored in the histogram memory 1. The contents of the memory 1 is periodically cleared to reset respective data to zero. This reset period is typically selected to be a period corresponding to one vertical scanning interval or a multiple of the vertical scanning period. Then, look-up table operating circuit 2 accumulates data of the histogram stored in the histogram memory, as indicated by a signal b calculates a normalization coefficient so that the maximum cumulative frequency of occurrence of the input luminance becomes the maximum value of the output luminance level, and multiplies respective data of the histogram by the derived coefficient. As a result, the multiplied as indicated by a signal c are stored in look-up table memory 3. This process is sown in FIGS. 2B and 2C. Look-up table memory 3 outputs a difference between the data corresponding to a luminance level of the input signal a and the signal c produced from the look-up table operating circuit 2 as a correction signal d. On the other hand, the maximum value detecting circuit 4 detects the maximum value e of the data obtained at the histogram memory 1. Then, the inverter 5 derives an inverse value f from the maximum value e. Multiplier 6 multiples the inverse value f of the maximum value e by the correction signal d. Through this process, the intensity correction signal g, as illustrated in FIG. 2D, can be derived so that intensity correction can be performed with intensity correction signal g.

According to this embodiment as set forth above, when the luminance level of the input signal is concentrated at a particular luminance level, since the maximum value 3 becomes large, the intensity correction signal g becomes small as shown in FIGS. 2E to 2H. As a result, the magnitude of intensity correction can be made smaller.

The second embodiment of an intensity correction device according to the present invention will be discussed below with reference to the drawings.

Figure 3:
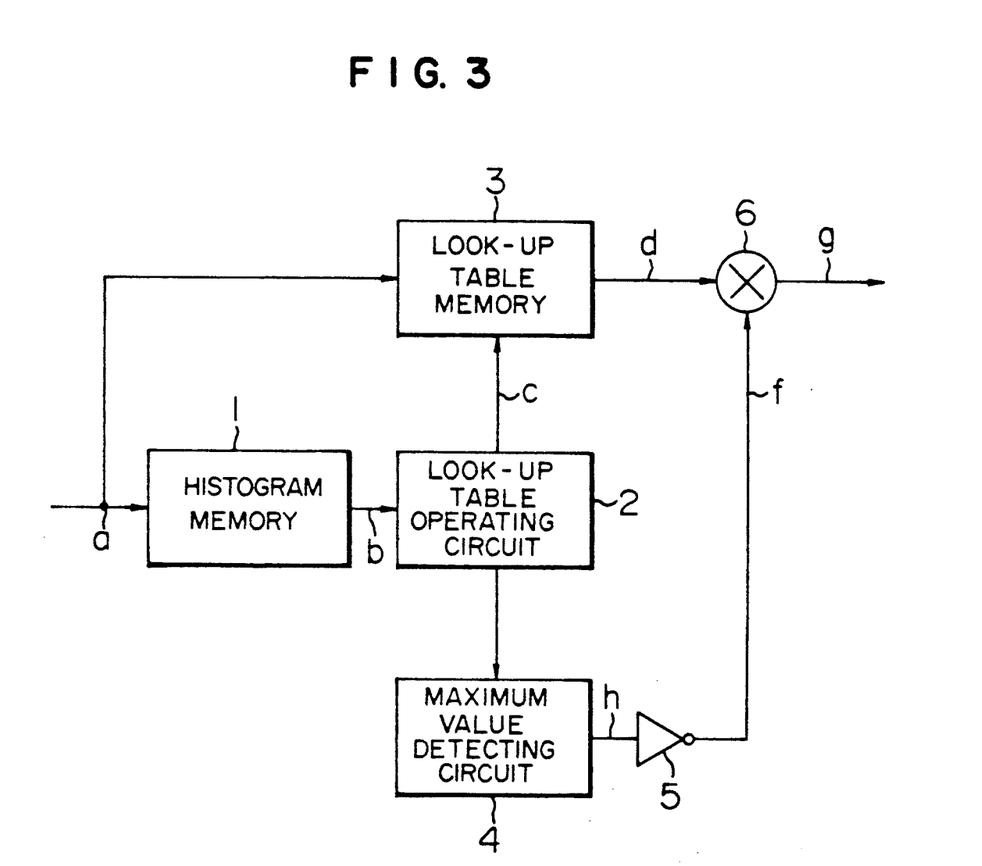
FIG. 3 is a block diagram of a second embodiment of an intensity correction device according to the present invention.

FIG. 3 is a block diagram showing the second embodiment of the intensity correction device according to the present invention. In FIG. 3, reference numeral 1 denotes a histogram for detecting luminance distribution of an input luminance signal. Reference numeral 2 denotes a look-up table operating circuit 2 for accumulating the histogram and normalizing respective data so that the maximum cumulative frequency becomes the maximum value of an output luminance signal. Reference numeral 3 denotes a look-up table memory for storing the data normalized by the look-up table operating circuit 2 and for permitting output of a correction signal corresponding to the luminance level of the input signal. Reference numeral 4 denotes a maximum value detecting circuit for detecting a maximum value of the normalized data of the histogram obtained by look-up table operating circuit 2. Reference numeral 5 denotes an inverter for obtaining an inverse value of the maximum value obtained at the maximum value detecting circuit 4. Reference numeral 6 denotes a multiplier for multiplying the inverse value of the maximum value obtained through inverter 5 by the correction signal output from look-up table memory 3.

Figure 7A:
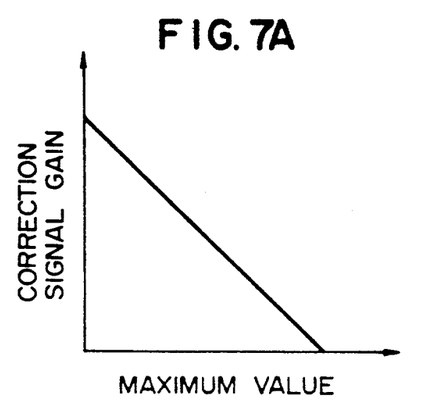
FIGS. 7A–7C are plurality of graphs showing a relationship between a maximum value and an intensity correction signal.
Figure 7B:
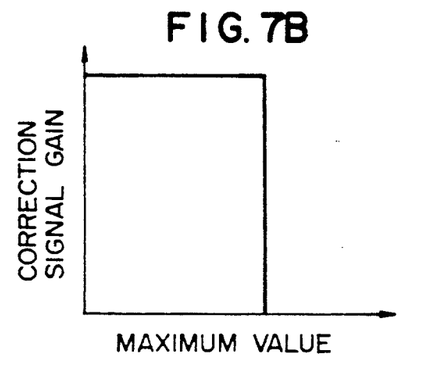
Figure 7C:
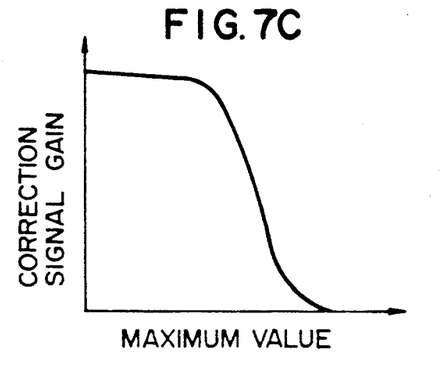

Operation of the second embodiment of the intensity correction device constructed as set forth above will be discussed with reference to FIGS. 2, 4 and 7. FIG. 2 shows a process of luminance conversion.

Figure 4A:
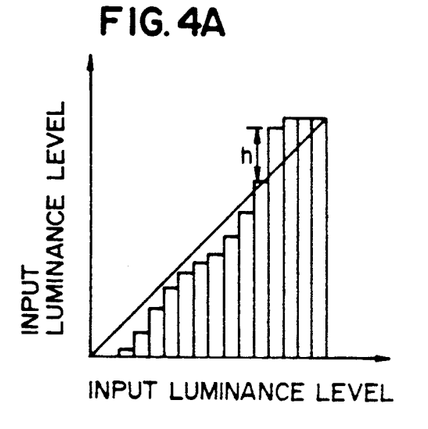
FIGS. 4A–4D are plurality of graphs illustrating operation of the second embodiment of the intensity correction device.
Figure 4B:
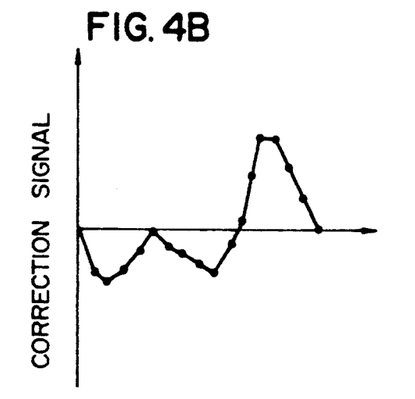

At first, a histogram is established by accumulating input luminance levels into appropriate intensity groups. Them, the luminance distribution of the input luminance signal, as illustrated in FIG. 2A, is stored in histogram memory 1. The content of memory 1 is periodically cleared to reset respective data to zero. This periodic reset is typically selected to be a period corresponding to one vertical scanning interval or a multiple of vertical scanning intervals. Then, look-up table operating circuit 2 accumulates data of this histogram stored in the histogram memory, as indicated by a signal b, calculates a normalization coefficient so that the maximum cumulative frequency of occurrence of the input luminance becomes the maximum value of the output luminance level, and multiplies respective data of the histogram derived coefficient. The results are stored in is look-up table memory 3. This process is shown in FIGS. 2B and 2C. Look-up table memory 3 outputs a difference between the data corresponding to a luminance level of the input signal a and the value c from look-up table operating circuit 2 as a correction signal d. On the other hand, maximum value detecting circuit 4 detects the maximum value h of the difference of data obtained at the look-up table operating circuit 2. Then, in inverter 5, an inverse value f of the maximum value h is derived. Multiplexer 6 multiplies the inverse value f of the maximum value e by the correction signal d. Through this process, the intensity correction signal g, as illustrated in FIG. 4B, can be derived so that intensity correction can be performed with this intensity correction signal g.

Figure 4C:
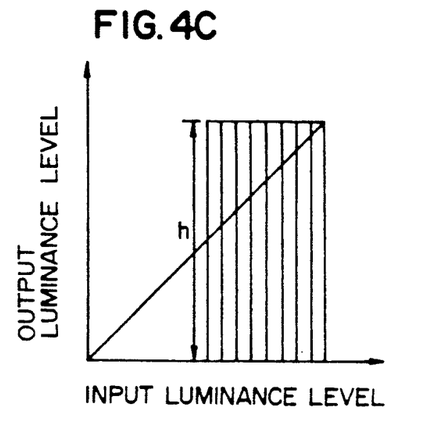
Figure 4D:
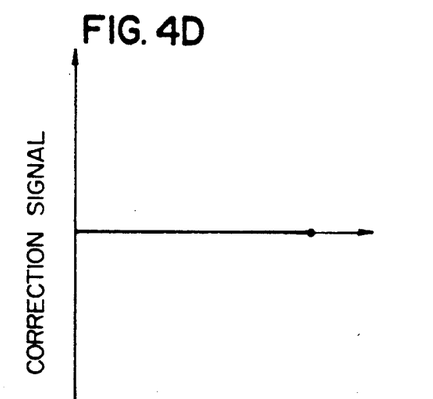

According to the second embodiment as set forth above, when the luminance level of the input signal is concentrated at a particular luminance level, since the maximum value h becomes large, the intensity correction signal g becomes small as shown in FIGS. 4C and 4D. The relationship between the maximum value h and the intensity correction signal g is illustrated in FIG. 7A. As can be appreciated, the second embodiment is differentiated from the first embodiment in that the maximum value of the difference of the normalized data is detected. Therefore, the upper limit of the maximum value of the difference is constant irrespective of the values of overall histogram. As a result, the intensity correction signal g corresponding to the luminance distribution can be easily obtained. Also, when the luminance level is concentrated, the magnitude of intensity correction can be made smaller.

The third embodiment of the intensity correction device according to the present invention will be discussed below with reference to the drawings.

Figure 5:
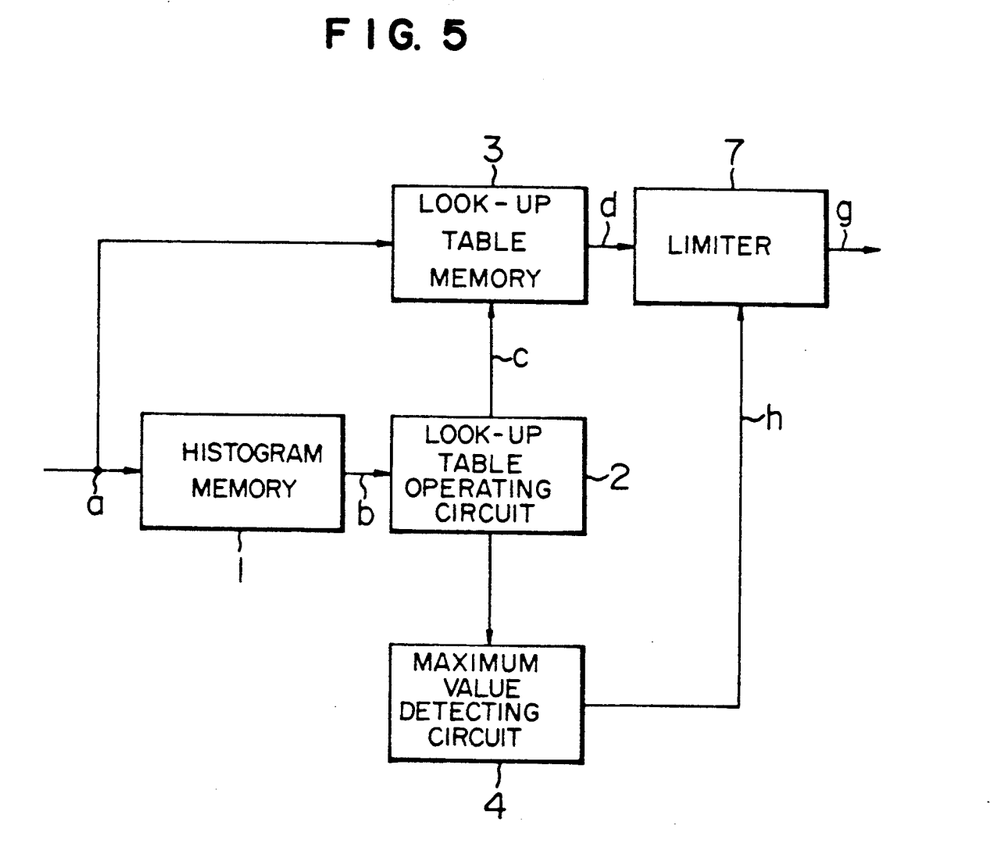
FIG. 5 is a block diagram of a third embodiment of an intensity correction device according to the present invention.

FIG. 5 is a block diagram showing the third embodiment of the intensity correction device according to the present invention. In FIG. 5, reference numeral 1 denotes a histogram for detecting luminance distribution of an input luminance signal. Reference numeral 2 denotes a look-up table operating circuit 2 for accumulating data of the histogram stored in the histogram memory, as indicated by a signal b and normalizing respective data so that the maximum cumulative frequency becomes the maximum value of an output luminance signal. Reference numeral 3 denotes a look-up table memory for storing the data normalized by the look-up table operating circuit 2 and for permitting output of a correction signal corresponding to the luminance level of the input signal. Reference numeral 4 denotes a maximum value detecting circuit for detecting a maximum value of the normalized data of the histogram obtained by look-up table operating circuit 2. Reference numeral 7 denotes a limiter for setting the correction signal to zero when the maximum value obtained by the maximum value detecting circuit 4 exceeds a given value.

Operation of the third embodiment of the intensity correction device constructed as set forth above will be discussed with reference to FIGS. 2, 4 and 7. FIG. 2 shows a process of luminance conversion.

At first, a histogram is established by accumulation the input luminance levels into appropriate intensity groups. Then, the luminance distribution of the input luminance signal a as illustrated in FIG. 2A is stored in the histogram memory 1. The content of memory 1 is periodically cleared to reset respective data to zero. This periodic reset is typically selected to be a period corresponding to one vertical scanning interval or a multiple value c from look-up table operating 2. The, look-up table operating circuit 2 accumulates the histogram, calculates a normalization coefficient so that the maximum cumulative frequency of occurrence of the input luminance becomes the maximum value of the output luminance level, and multiples respective data of the histogram by the derived coefficient. The results are stored in look-up table memory 3. This process is shown in FIGS. 2B and 2C. Look up table memory 3 outputs a difference between the data corresponding to a luminance level of the input signal a and the value c from look-up table operating circuit 2 as a correction signal d. On the other hand, maximum value detecting circuit 4 detects the maximum value h of the difference of data obtained at look-up table operating circuit 2. When the maximum value h exceeds a given value, limiter 7 makes the intensity correction signal g zero.

With the third embodiment of the intensity correction device according to the present invention, when the input luminance signal is concentrated at a particular luminance level, the maximum value h is increased to exceed the given value. Then, the intensity correction signal g becomes zero. The relationship between the maximum value h and the intensity correction signal g is illustrated in FIG. 7B. Conversely to the foregoing second embodiment, the third embodiment of the intensity correction device does not effect intensity correction when the maximum value h exceeds the given value.

The fourth embodiment of the intensity correction device according to the present invention will be discussed below with reference to the drawings.

Figure 6:
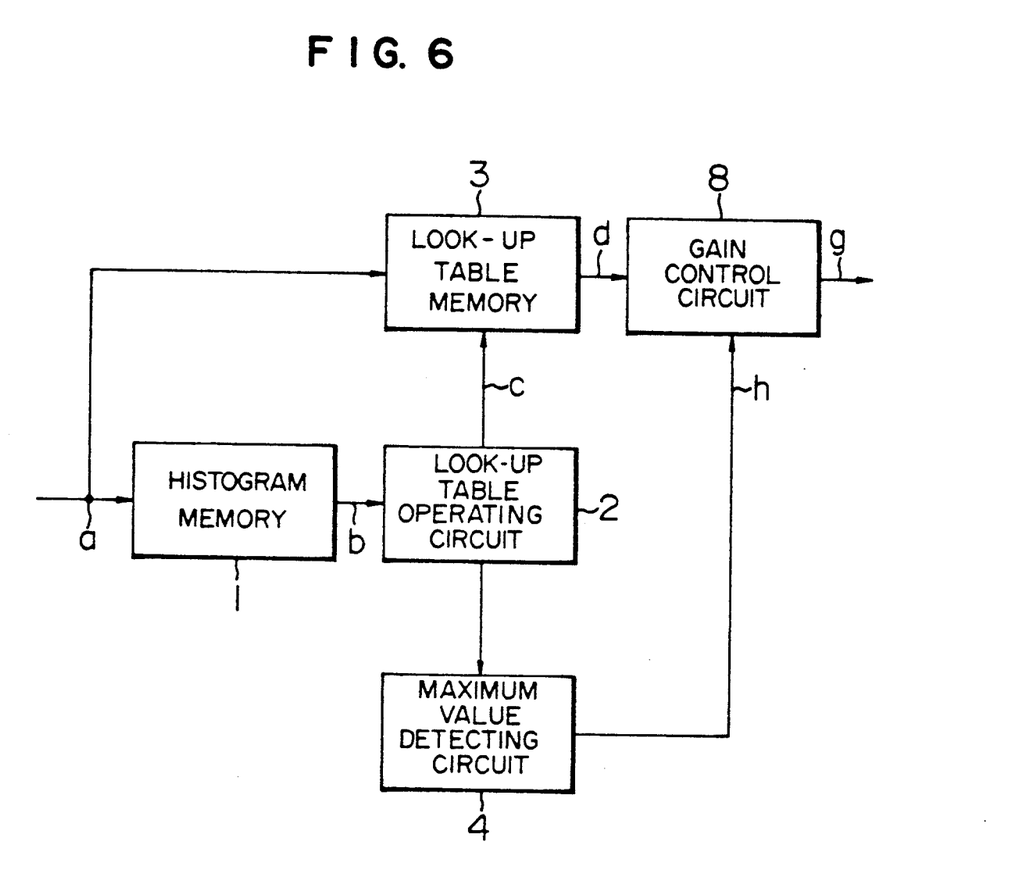
FIG. 6 is a block diagram of a fourth embodiment of an intensity correction device according to the present invention.

FIG. 6 is a block diagram showing the fourth embodiment of the intensity correction device according to the present invention. In FIG. 6, reference numeral 1 denotes a histogram for detecting luminance distribution of an input luminance signal. Reference numeral 2 denotes a look-up table operating circuit 2 for accumulating data of the histogram stored in the histogram memory, as indicated by a signal b and normalizing respective data so that the maximum cumulative frequency becomes the maximum value of an output luminance signal. Reference numeral denotes a look-up table memory for storing the data normalized by look-up table operating circuit 2 and for permitting output of a correction signal corresponding to the luminance level of the input signal. Reference numeral 4 denotes a maximum value detecting circuit for detecting a maximum value of the normalized data of the histogram obtained by look-up table operating circuit 2. Reference numeral 8 denotes a gain control circuit for varying gain of the correction signal d depending upon the maximum value obtained at maximum value detecting circuit 4.

Operation of the fourth embodiment of the intensity correction device constructed as set forth above will be discussed with reference to FIGS. 2, 4 and 7. FIG. 2 shows a process of luminance conversion.

At first, the histogram is established by accumulating input luminance levels into appropriate intensity groups. Then, the luminance distribution of the input luminance signal a as illustrated in FIG. 2A is stored in histogram memory 1. The content of memory 1 is periodically cleared to reset respective data to zero. This periodic reset is typically selected to be a period corresponding to one vertical scanning interval or a multiple of the vertical scanning interval. Then, look-up table operating circuit 2 accumulates the histogram, calculates a normalization coefficient so that the maximum cumulative frequency of occurrence of the input luminance becomes the maximum value of the output luminance level, and multiples respective data of the histogram by the derived coefficient. The results are stored in look-up table memory 3. This process are shown in FIGS. 2B and 2C. Look-up table memory 3 outputs a difference between the data corresponding to a luminance level of the input signal a and the value c from look-up table operating circuit 2 as a correction signal d. On the other hand, maximum value detecting circuit 4 detects the maximum value h of the difference of data obtained at look-up table operating circuit 2. Then, by gain control circuit 8, the intensity correction signal g varying the gain of the correction signal d depending upon the maximum value h to obtain correction signal of The intensity correction is thus performed with this intensity correction signal g.

With the fourth embodiment as set forth above, when the input luminance signal is concentrated at a particular luminance level, the maximum value h becomes larger. In such case, the gain o the correction signal d is controlled by gain control circuit 8 to make the intensity correction signal g smaller. One example of the relationship between the maximum value h and the intensity correction signal g is illustrated in FIG. 7C. Different from the foregoing third embodiment of the intensity correction device, the fourth embodiment performs a smooth variation of the gain so that intensity correction can be done without causing a noticeable variation of intensity.

It should be noted that, although all of the embodiments disclosed employ histogram memory 1, the histogram memory can be a cumulative histogram which derives a cumulative histogram. In such case, the cumulative function of look-up table operating circuit 2 can be neglected.

What is claimed is:

1. An intensity correction device comprising:
a histogram memory for forming a histogram of an input luminance signal;
a look-up table operating circuit for accumulating the histogram and normalizing the accumulated histogram so that a maximum cumulative frequency of occurrence of the input luminance signal becomes a maximum value of an output luminance signal;
a look-up table memory for storing the normalized data and outputting a correction signal in response to the input luminance signal;
a maximum value detecting circuit for detecting a maximum value of the histogram; and
a multiplier for multiplying an inverse value of the maximum value detected by said maximum value detecting circuit and the correction signal.

2. An intensity correction device comprising:
a histogram memory for forming a histogram of an input luminance signal;
a look-up table operating circuit for accumulating the histogram and normalizing the accumulated histogram so that the maximum cumulative frequency of occurrence of the input luminance signal becomes a maximum value of an output luminance signal;
a look-up table memory for storing the normalized data and outputting a correction signal in response to the input luminance signal;
a multiple for multiplying an inverse value of the maximum value detected by said maximum value detecting circuit and the correction signal.

3. An intensity correction device comprising:
a histogram memory for forming a histogram of an input luminance signal;
a look-up table operating circuit for accumulating the histogram and normalizing the accumulated histogram so that a maximum cumulative frequency of occurrence of the input luminance signal becomes a maximum value of an output luminance signal;
a look-up table memory for storing the normalized data and outputting a correction signal in response to the input luminance signal;
a maximum value detecting circuit for detecting a maximum value of differences of the normalized data; and
a limiter for setting the correction signal to zero when said maximum value detected by the maximum value detecting circuit exceeds a predetermined value.

4. An intensity correction device comprising:

a histogram memory for forming a histogram of an input luminance signal;

a look-up table operating circuit for accumulating the histogram and normalizing the accumulated histogram so that a maximum cumulative frequency becomes a maximum value of an output luminance signal;

a look-up table memory for storing the normalized data and outputting a correction signal in response to the input luminance signal;

a maximum value detecting circuit for detecting a maximum value of differences of the normalized data; and a gain control circuit for varying gain of said correction signal depending upon said maximum value detected by said maximum value detecting circuit.

* * * * *